Patented Sept. 19, 1944

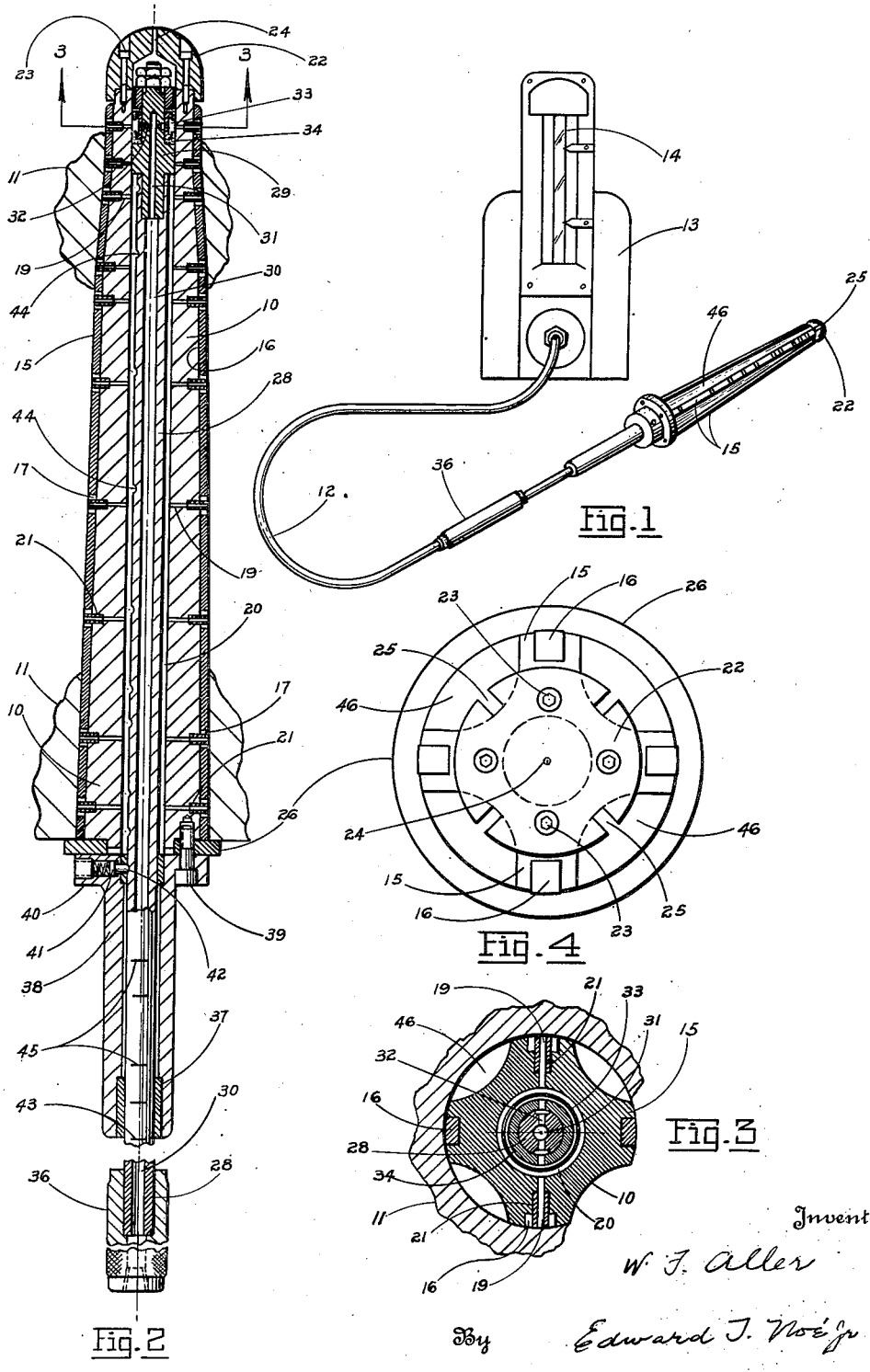

2,358,769

UNITED STATES PATENT OFFICE 2,358,769

GAUGING DEVICE

Willis Fay Aller, Dayton, Ohio, assignor to The Sheffield Corporation, Dayton, Ohio, a corporation of Ohio Application March 6, 1943, Serial No. 478,209

8 Claims. (Cl. 33—178)

This invention relates to gauging devices for determining or comparing diametrical or other dimensions or forms of workpieces.

One object of the invention is the provision of a gauging device employing the flow of fluid through leakage paths between the workpiece and a gauging element to determine the form of dimensions of the workpiece, the gauging element being so constructed and arranged as to provide selective connection of a desired leakage path.

Another object is the provision of a gauging device having a fluid chamber which can be connected to a fluid pressure source and an instrument responsive to fluid flow, the body member of the gauging device having a plurality of axially spaced fluid passages arranged for cooperation with different locations on the workpiece and adapted to be selectively connected to the flow measuring instrument.

Another object is the provision of a gauging device for gauging a tapered surface of a workpiece, and employing a series of fluid leakage passages terminating at different locations along the tapering surface of the workpiece, with means provided to selectively establish communication between the passages and an instrument responsive to fluid flow.

A further object is the provision of a gauging device of the character mentioned, in which an axially movable rod is operable along a chamber in the body member to different selected positions in which it selectively establishes communication between a desired fluid passage and the instrument which is responsive to fluid flow.

Other objects and advantages of the invention will be apparent from the following description, the appended claims, and the accompanying drawings, in which, Fig. 1 is a perspective view showing a gauging device embodying the present invention, in its association with a flow responsive instrument;

Fig. 2 is a central longitudinal section through the gauging device, with portions of the workpiece also illustrated;

Fig. 3 is a transverse section on the line 3—3 of Fig. 2; and,

Fig. 4 is an end view of the gauging device.

In the drawing, in which a preferred embodiment of the invention has been illustrated, the same reference numerals have been used to designate like parts in the several views. Referring more particularly to the drawing, the gauging device as shown comprises an elongated body member 10 which is adapted for interfitting association with a workpiece, herein shown as an elongated member 11. While the gauging body member may be either a male or female part, as herein shown it is adapted to enter the workpiece to be gauged to obtain diametrical measurements or comparisons with a part of known size and form, and is adapted to compare or check the taper of an internal tapering surface of the workpiece. The body member is provided with a series of fluid passages terminating in orifices arranged so they will be closely adjacent the parts of the workpiece to be gauged and provide fluid leakage paths, the sizes of the fluid leakage paths between the body member and the workpiece determining the rate of flow of fluid from a suitable fluid pressure source. For the supply of fluid pressure and for determining the rate of flow through the fluid passages in the body member, the latter is connected, as shown in Fig. 1, by means of a flexible tube 12 to an instrument 13 which is responsive to fluid flow through the gauging device. The instrument is connected to a suitable source of fluid pressure which may be positive or negative with respect to atmospheric pressure, and the rate of flow of fluid through the tube 12 and through a selected orifice or fluid passage in the gauging device is indicated by a float arranged in the transparent vertical tube 14, the flow responsive instrument being preferably of the construction more fully described in Pat. 2,254,259 granted September 2, 1941.

Since, in the form of construction herein illustrated, the gauging device is to compare or check different areas in the workpiece 11 having different degrees of taper, the body member is provided with work engaging portions 15 which substantially interfit with and guide the body member as the latter is applied to the workpiece, with an operating clearance between these portions 15 and the workpiece so that the guiding portions of the body member will not jam against a workpiece of the required size. Hard inserts or strip 16 of Carboloy or other hard material are preferably arranged in the work guiding portions of the body member, with spaces 17 between the ends of the Carboloy strips.

Axially spaced along the body member are fluid passages 19 extending outwardly from a passage or chamber 20 and preferably terminating in nozzle inserts 21 arranged in the spaces 17. These inserts are located between and thus protected by adjacent Carboloy strips 16. The outer ends of these nozzle inserts lie a few thousandths of an inch inwardly of the outer surface of the Carboloy strips and co-act with the adjacent surfaces of the work to permit leakage of fluid supplied to the chamber 20, the rate of fluid leakage providing an indication of the clearance between the outer sides of the nozzles of the workpiece. At each axial location along the body member the fluid passages 19 are preferably arranged in opposed or aligned pairs. At one end of the body member is an end block or cap 22 held in place by bolts 23 and provided with a central passage 24 and suitable air relieving grooves 25. At the other end of the body member the latter is fixed to a locating disc or flange 26 which is adapted to contact the end of the workpiece and definitely determine the extent to which the body member is inserted in the workpiece. The longitudinally extending work guiding surfaces of the body member are so formed that their diametrical measurement at any point along the workpiece is slightly less than that of the workpiece when the flange 26 is in contact with the end of the workpiece.

A connection rod or control member 28 is arranged in the body member. At one end it is provided with a piston or a valve member 29 which is axially slidable along the body member. The rod 28 is provided with an axial chamber 30 communicating with the axially extending passage or chamber portion 31 in the piston. This passage 31 is in communication with branch passages 32 which communicate in turn with an annular space 33. Flexible packing rings 34 of leather or other suitable material form an effective seal against leakage between the body member and the piston along the outside of the piston, while permitting axial movement of the latter. In the position in which the piston is shown in Fig. 2, the two radially extending fluid passages 19 near the smaller end of the body member are placed in free communication with the fluid supply chamber portions 31 and 30 within the body member, while there is no communication established between the supply chamber and the other fluid passages 19. Since the rod 28 is connected through the flexible tube 12 to the flow responsive instrument, it will be apparent that the indication on the instrument will show the fluid leakage taking place through the two passages 19 at the end of the body member, and the remaining fluid passages under these conditions will have no effect. The connection between the flexible tube 12 and the rod 28 is effected by an extension 36 secured to the end of the rod and adapted to be grasped by the operator for adjustment in the axial position of the piston in the body member. The rod extends through a bushing 37 in the guide part 38 which is secured by means of a bolt 39 to both the flange 26 and the body member 10. The guide part 38 is provided with a flange 40 in which is a spring pressed sliding pin or detent 41 having a rounded end which fits in a depression or groove 42 in the outer surface of the rod 28 to locate the rod, in a yielding manner, in a predetermined position in which the piston 29 establishes communication between the fluid supply chamber and the outwardly extending fluid passages 19 at the end of the body member. In this position of the rod, a mark or index line 43 on the rod is in a position just beyond the end of the guide part 38 and visible to the operator.

The rod 28 is also provided with additional depressions 44 and with additional index lines or marks 45, one of the depressions and one of the marks corresponding to one of each of the other pairs of radial fluid passages in the body member. The operator by pulling or pushing on the rod can thus adjust the piston to a desired position along the length of the body member, and establish communication between the indicating instrument and any selected pair of fluid passages in the body member, the spring depressed detent snapping into the proper depression or groove in the rod 28 when the piston is in its proper position. The operator is thus enabled to selectively connect the axially spaced fluid passages one after the other to the indicating instrument, and each time a connection is made he can obtain a reading on the instrument to compare the dimensions at the different axial locations along the workpiece with the readings obtained at these several locations when a workpiece of the exact form and size is used. An accurate indication of the taper or of the different tapers of a workpiece is thus readily obtainable by using the same gauging element.

As the piston is moved along the body member, air is relieved through the passage 24 in the end member, and if the hole being tested is a blind hole, this air can be relieved from the hole through the grooves 25 and through the passages or fluted ways 46 between the work guiding portions of the body member.

While the form of device herein described constitutes a preferred embodiment of the invention, it is to be understood that the invention is not limited to this precise form and that changes may be made therein without departing from the scope of the invention which is defined in the appended claims.

What is claimed is:

1. A gauging device comprising a body member adapted for interfitting engagement with a workpiece, said body member having a fluid chamber adapted for connection to a fluid pressure source and to an instrument responsive to fluid flow, said body member having a plurality of work engaging portions substantially corresponding to the form of a plurality of portions of the workpiece, fluid passages in said body member terminating at the different portions of the workpiece, and means operable to establish communication selectively between said chamber and said fluid passages.

2. A device for gauging size characteristics comprising a body member adapted for interfitting engagement with a workpiece, said body member having a plurality of work engaging portions substantially corresponding to the form of a plurality of portions of a workpiece, fluid passages in said body member terminating at different portions of the workpiece, means operable in said body member and providing a fluid chamber and adapted for connection to a fluid pressure source and to an instrument responsive to fluid flow, sair means being operable to establish communication selectively between said chamber and a selected fluid passage in the body member.

3. A device for gauging different axial positions along a workpiece comprising a body member adapted for interfitting engagement with a workpiece, said body member having a fluid chamber adapted for connection to a fluid pressure source and to an instrument responsive to fluid flow, said body member also having a series of axially spaced passages terminating closely adjacent the workpiece location at graduated distances from the axis of the body member to provide fluid leakage paths, and means operable to establish communication between said chamber and a selected fluid passage in the body member.

4. A gauging device comprising an elongated body member adapted for telescopic engagement inside of a workpiece, said body member having an axially extending chamber and having a series of outwardly extending fluid passages terminating adjacent the outer surface thereof at different axial locations along the body member, and means adapted for connection to a flow responsive instrument and operable in said chamber to establish communication with a selected fluid passage.

5. A gauging device comprising a body member adapted for interfitting engagement with a workpiece, said body member having an axially extending hollow rod adapted for connection to a fluid pressure source and to an instrument responsive to fluid flow, said body member having a plurality of tapered work engaging portions substantially corresponding to the taper of a plurality of portions of the workpiece, axially spaced fluid passages in said body member terminating at the different portions of the workpiece, said rod having connection means for selectively establishing communication with said fluid passages.

6. A device for gauging taper characteristics comprising a body member adapted for interfitting engagement with a workpiece, said body member having a plurality of tapered work engaging portions substantially corresponding to the form of a plurality of portions of a workpiece, axially spaced fluid passages in said body member terminating at different portions of the workpiece, means operable in said body member and providing a fluid chamber and adapted for connection to a fluid pressure source and to an instrument responsive to fluid flow, said means being adjustable to establish communication selectively between said chamber and a selected fluid passage in the body member, and a device for locating said means in its various positions of adjustment.

7. A taper gauging device comprising a body member adapted for interfitting engagement with a workpiece, a locating part at one end of said body member, said body member having a series of axially spaced passages terminating closely adjacent the workpiece location at graduated distances from the axis of the body member to provide 3 fluid leakage paths, and means operable to selectively establish communication between a selected fluid passage in the body member and an instrument responsive to fluid flow.

8. A device for gauging taper characteristics comprising an elongated body member adapted for telescopic engagement inside of a workpiece, said body member having an axially extending passage and having a series of outwardly extending fluid passages terminating adjacent the outer surface thereof at different axial locations along the body member, a hollow rod slidably operable in said passage and having a piston for establishing communication with a selected fluid passage and the interior of the rod, means on said body member for determining the axial position of the body member, and means for yieldingly holding said rod in a desired position of adjustment.

WILLIS FAY ALLER.